United States Patent [19]

Kawamura et al.

[11] 4,450,395

[45] May 22, 1984

[54] SYSTEM FOR CONTROLLING SYNCHRONOUS MOTORS

[75] Inventors: Akira Kawamura, Numazu; Tadahiro Ono, Shizuoka, both of Japan

[73] Assignees: Toshiba Kikai Kabushiki Kaisha; Toei Denki Kabushiki Kaisha, both of Tokyo, Japan

[21] Appl. No.: 390,776

[22] Filed: Jun. 21, 1982

[51] Int. Cl.³ .............................................. H02P 5/28
[52] U.S. Cl. ...................................... 318/700; 318/720; 318/721; 318/722; 318/723; 318/729; 318/438; 318/809; 318/823
[58] Field of Search ............... 318/700, 720, 721, 722, 318/723, 799, 807, 809, 823, 729, 438

[56] References Cited

U.S. PATENT DOCUMENTS

| | | | |
|---|---|---|---|
| 3,787,723 | 1/1974 | Magnuson et al. | 318/823 |
| 4,008,425 | 2/1977 | Dickey | 318/254 X |
| 4,078,191 | 3/1978 | Morters et al. | 318/799 |
| 4,158,801 | 6/1979 | Hirata | 318/809 X |
| 4,262,241 | 4/1981 | Azusawa | 318/722 X |
| 4,280,085 | 7/1981 | Cutler et al. | 318/807 X |
| 4,292,577 | 9/1981 | Cesarz et al. | 318/723 X |
| 4,310,791 | 1/1982 | Akamatsu | 318/809 X |

FOREIGN PATENT DOCUMENTS 0009784  4/1980  European Pat. Off. ............ 318/439

*Primary Examiner*—G. Z. Rubinson
*Assistant Examiner*—Shik Luen Ip
*Attorney, Agent, or Firm*—Cushman, Darby & Cushman

[57] ABSTRACT

Control system for driving a synchronous motor at a speed greater than a rated speed with a rotational speed detector for the rotor mounted on the motor, rotational position detector for detecting the rotational position of the field pole of the motor, an error signal generator which produces the difference between a desired speed signal and an actual rotational speed signal, and a calculating device for calculating armature current component values Id, Iq and power-factor $\phi$.

3 Claims, 4 Drawing Figures

SYSTEM FOR CONTROLLING SYNCHRONOUS MOTORS

BACKGROUND OF THE INVENTION

1. Field of the Invention

The present invention relates to a control system for driving synchronous motors at speeds higher than rated speeds.

2. Description of the Prior Art

Synchronous motors have heretofore been used in a wide field of applications and, in most cases, are operated at constant speed utilizing their constant-speed characteristics. Synchronous motors excited with permanent magnets, however, are often driven at varying speeds, and are sometimes operated at speeds greater than the rated speeds.

To run the synchronous motor at speeds faster than the rated speed, however, it is necessary to increase not only the frequency of the power supply but also to increase the power-supply voltage in view of its characteristics.

This is illustrated below. FIG. 1 is a vector diagram showing the relationship between the voltage and the current when a general salient-pole synchronous motor is operated. From FIG. 1, the following relationship holds true:

$$\dot{V} = \dot{E} + \dot{I}qr + \dot{I}dr + j\dot{I}dXd + j\dot{I}qXq \qquad (1)$$

where $\dot{V}$ denotes a terminal voltage V, $\dot{E}$ denotes an induced electromotive force [volts], $\dot{I}d$ and $\dot{I}q$ denote a direct-axis current component [amps] and a quadrature-axis current component [amps] in the armature current I, Xd and Xq denote a direct-axis reactance [ohms] and a quadrature-axis reactance [ohms], and r denotes an armature resistance.

If now the angular velocity of the rotor is given by $\omega r$ [rad/s], the induced electromotive force $\dot{E}$, the direct-axis reactance Xd and the quadrature-axis reactance Xq in the above equation (1) are given by, $$\dot{E} = K_E \cdot \omega r \qquad (2a)$$

$$Xd = K_d \cdot \omega r \qquad (2b)$$

$$Xq = K_q \cdot \omega r \qquad (2c)$$

where $K_E$, $K_d$ and $K_q$ denote coefficients.

Here, the induced electromotive force is denoted by $\dot{E}_1$ [volts], the direct-axis reactance is denoted by $Xd_1$ [ohms] and the quadrature-axis reactance is denoted by $Xq_1$ [ohms] when the synchronous motor is running at a rated speed $\omega n$ [rad/s]. Then, if the induced electromotive force is denoted by $\dot{E}_2$ [volts], the direct-axis reactance by $Xd_2$ [ohms] and the quadrature-axis reactance by $Xq_2$ [ohms] with the angular velocity of the synchronous motor being changed to $2\omega n$ [rad/s], the following relations hold true from the above relations (2a), (2b), and (2c):

$$\dot{E}_2 = 2\dot{E}_1 \qquad (3a)$$

$$Xd_2 = 2Xd_1 \qquad (3b)$$

$$Xq_2 = 2Xq_1 \qquad (3c)$$

Further, from the equation (1) and referring to FIG. 1, the magnitude V [volts] or vector V is given by, $$V = \sqrt{(E + Iq \cdot r + Id \cdot Xd)^2 + (Iq \cdot Xq - Id \cdot r)^2} \qquad (4)$$

Therefore, if the terminal voltage, direct-axis current component and quadrature-axis current component are denoted by $V_1$ [volts], $Id_1$ [amps] and $Iq_1$ [amps] when the synchronous motor is running at the angular velocity $\omega n$ [rad/s], and if the above-mentioned quantities are denoted by $V_2$ [volts], $Id_2$ [amps] and $Iq_2$ [amps] when the synchronous motor is running at the angular velocity $2\omega n$ [rad/s], there hold the following equations:

$$V_1 = \sqrt{(K_E \cdot \omega n + Iq_1 \cdot r + Id_1 \cdot Kd \cdot \omega n)^2 + (Iq_1 \cdot Kq \cdot \omega n - Id_1 \cdot r)^2} \qquad (5)$$

$$V_2 = \sqrt{(K_E \cdot 2\omega n + Iq_2 \cdot r + Id_2 \cdot Kd \cdot 2\omega n)^2 + (Iq_2 \cdot Kq \cdot 2\omega n - Id_2 \cdot r)^2} \qquad (6)$$

Here, if further there hold the following relations, $$Id_1 \cdot Kd \cdot \omega n = Id_2 \cdot Kd \cdot 2\omega n \qquad (7a)$$

$$Iq_1 \cdot Kq \cdot \omega n = Iq_2 \cdot Kq \cdot 2\omega n \qquad (7b)$$

the above equation (6) becomes as follows:

$$V_2 = [E_1^2 + 2E_1(E_1 + Iq_2 \cdot r + Id_1 \cdot Xd_1) + V_1^2]^{\frac{1}{2}} \qquad (8)$$

and, hence, $V_2$ assumes a value nearly twice that of $V_1$. Further, when the motor runs at an angular velocity $3\omega n$, the terminal voltage $V_3$ will be about three times the terminal voltage $V_1$, provided the conditions corresponding to the above relations (7a), (7b) hold true. For example, in a one synchronous motor, assuming the rotational speed is denoted by N(rpm), other coefficients are as follows.

E = 0.09 N [volts]
Xd = 0.006 N [ohms]
Xq = 0.004 N [ohms]
r = 0.8 [ohms]
$Iq_1$ = 4 [amps]
$Id_1$ = 3 [amps]

In the case of the conditions above, further the value of N is given as 1,000 [rpm] the equation (5) is as follows:

$$V_1 = \sqrt{(90 + 0.8 \times 4 + 0.6 \times 3)^2 + (0.4 \times 4 - 0.8 \times 3)^2} = 95 \text{ [volts]}$$

Then, the value of N is given as 2,000 [rpm] and when the following equations hold true:

$$Iq_1 \cdot Xq_1 = Iq_2 \cdot Xq_2$$

$$Id_1 \cdot Xd_1 = Id_2 \cdot Xd_2$$

The value of $V_2$ corresponding to equation (6) is as follows.

$$V_2 = \sqrt{(180 + 0.8 \times 2 + 1.2 \times 1.5)^2 + (0.8 \times 2 - 0.8 \times 1.5)^2}$$

$$= 183 \text{ [volts]}$$

Therefore, the value of $V_2$ nearly equals to twice of the value of $V_1$.

Thus, when the power factor is lagging, when the torque angle $\delta$ is smaller than the power-factor angle $\phi$ and when the vector diagram of voltage and current is as shown in FIG. 1, it is necessary to apply a voltage greater than the terminal voltage which is applied when the motor is operated at the rated speed, if it is attempted to run the synchronous motor at a speed faster than the rated speed.

In recent years, a semiconductor power inverter has been frequently employed as a variable-frequency power supply for varying the speed of the motor. In this case, however, the upper limit of the power-supply voltage is limited by the voltage characteristics of the semiconductor element. This often determines the upper limit of the variable-speed operation when a predetermined output is required. Therefore, if it is attempted to run the synchronous motor over a wide range of speed, the rated voltage must be set to a low value. Consequently, the synchronous motor tends to become of the type which runs at a low voltage and on a heavy current. In other words, it becomes difficult to design and manufacture the machine.

The problem of the synchronous motor can be solved if the rated voltage is set to a large value. However, the maximum voltage the semiconductor elements forming the power supply can withstand imposes the upper limit on the power-supply voltage, which then imposes a limitation on the range for varying the speed of the synchronous motor. This is the defect inherent in the conventional system for controlling synchronous motors.

SUMMARY OF THE INVENTION

Therefore, the object of the present invention is to provide a control system which is capable of operating a synchronous motor at speeds faster than the rated speed without the need of increasing the power-supply voltage despite the increase in frequency. For this end, the present invention provides a rotational speed detector for the rotor mounted on the motor, a rotational position detector for detecting the rotational position of the field pole of the motor, an error signal producing device which produces the difference between the desired speed and the actual rotational speed, and a calculating device for calculating armature current component values and power factor.

THE PREFERRED EMBODIMENT OF THE PRESENT INVENTION

The theoretical ground on which the present invention is based will be described below.

Figure 1:
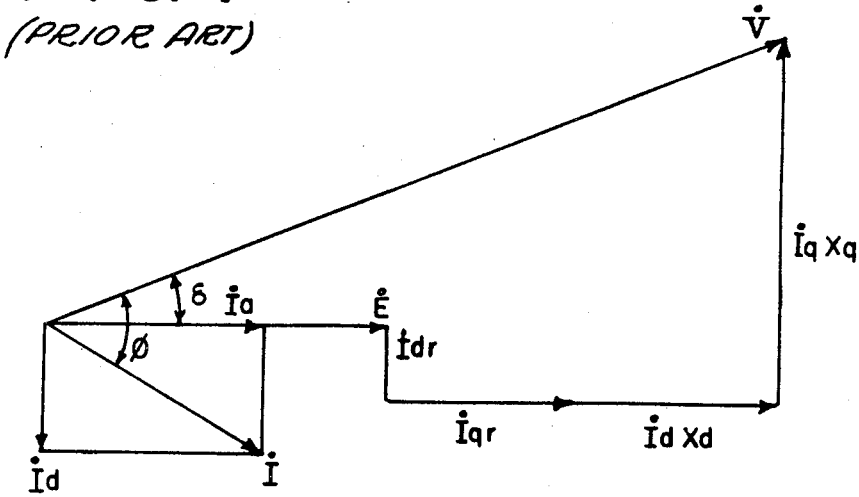
FIG. 1 illustrates a vector diagram showing a relationship between the voltage and the current when a general salient pole-type synchronous motor is operated.

To improve the defects mentioned with reference to FIG. 1, the power factor must be lagging, and the torque angle $\delta$ must be greater than the power-factor angle $\phi$.

In general, the output power Po [watts] of a synchronous motor is given by the following equation.

$$Po = 3E\, Iq \tag{9}$$

$$= 3E \frac{(r \cdot \cos \delta + Xd \cdot \sin \delta) V - r \cdot E}{r^2 + Xd \cdot Xq} \text{ [watts]}$$

In equation (9), the condition to maximize the value of Po with reference torque angle $\delta$ is to satisfy the following equations (10) and (11)

$$\frac{dPo}{d\delta} = 0 \tag{10}$$

$$-r \sin \delta + Xd \cdot \cos \delta = 0 \tag{11}$$

from equation (11), the following equation (12) is given:

$$\tan \delta m = \frac{Xd}{r} \tag{13}$$

Now, substituting to the equation (9) the value $\delta m$ given from equation (13), the value of Po is as follows.

$$\left.\frac{d^2 Po}{d\delta^2}\right|_{\delta=\delta m} < 0 \tag{14}$$

Therefore, the value of Po at $\delta = \delta m$ is maximum value.

From the vector diagram as shown in FIG. 1, Id and Iq are as follows:

$$Id = \frac{V(r \cdot \sin \delta - Xq \cdot \cos \delta) + Xq \cdot E}{r^2 + Xd \cdot Xq} \tag{15}$$

$$Iq = \frac{V(r \cdot \cos \delta + Xd \cdot \sin \delta) - r \cdot E}{r^2 + Xd \cdot Xq} \tag{16}$$

Therefore, the value of $\tan(\delta - \phi)$ from equation (15), and (16) is as follows:

$$\tan(\delta - \phi) = \frac{V(r \cdot \sin \delta - Xq \cdot \cos \delta) + Xq \cdot E}{V(r \cdot \cos \delta + Xd \cdot \sin \delta) - r \cdot E} \tag{17}$$

From equations (15), (16) and (17), the following equations (18), (19) and (20) can be derived:

$$\tan(\delta m - \phi) = \frac{V(r \cdot \sin \delta m - Xq \cdot \cos \delta m) + Xq \cdot E}{V(r \cdot \cos \delta m + Xd \cdot \sin \delta m) - r \cdot E} \tag{18}$$

$$Id = \frac{V(r \cdot \sin \delta m - Xq \cdot \cos \delta m) + Xq \cdot E}{r^2 + Xd \cdot Xq} \tag{19}$$

-continued $$Iq = \frac{V(r \cdot \cos \delta m + Xd \cdot \sin \delta m) - r \cdot E}{r^2 + Xd \cdot Xq} \quad (20)$$

Therefore, the output of the synchronous motor can be maximized while maintaining the same terminal voltage as the rated value if the torque angle of the synchronous motor is controlled, i.e., if phase difference between the terminal voltage V and the induced electromotive force E is controlled, and if the magnitude of the armature current I and its phase are controlled.

With this system, however, three quantities must be controlled, i.e., torque angle $\delta_m$, magnitude of armature current I and its phase or torque angle $\delta_m$, and quadrature-axis current component Iq and direct-axis current component Id. In this case, these three values must satisfy the above-mentioned equations (13), (18), (19) and (20), simultaneously. Consequently, the control system inevitably becomes complicated to some extent.

According to the present invention, the torque angle is controlled in accordance with the equation (13), and the phase of the armature current I is controlled in accordance with the equation (18) while maintaining the armature current I constant.

Figure 2:
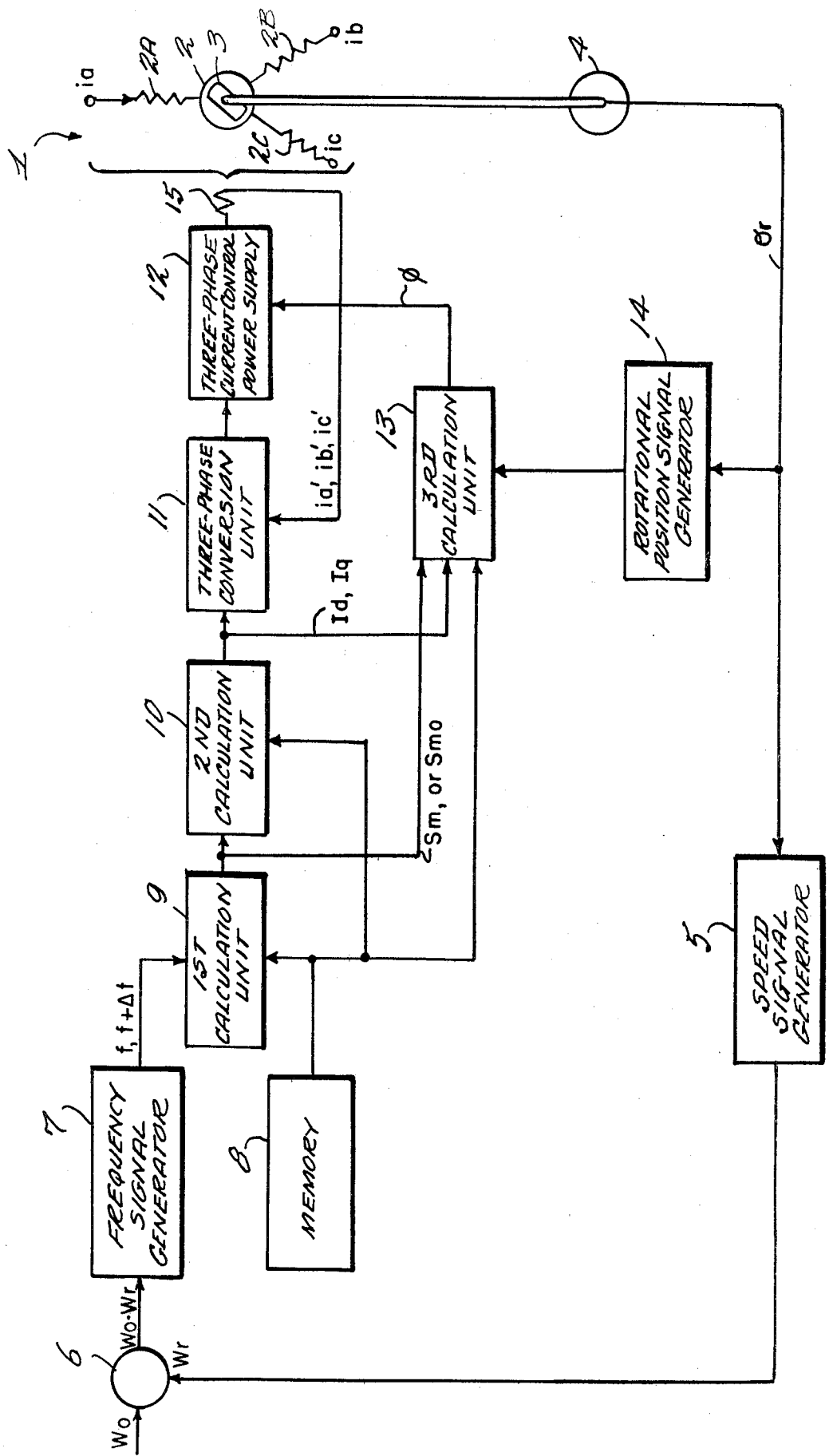
FIG. 2 illustrates a block diagram of an embodiment of a control system of the present invention.

An embodiment of the device for controlling synchronous motors according to the control system of the present invention will be described below in conjunction with FIG. 2. In putting the present invention into practice, there is no different between even when the system is operated on single-phase power or on multiphase power. The following description, however, deals with the case when a three-phase synchronous motor is to be controlled.

A synchronous motor 1 has an armature 2, armature windings 2A, 2B and 2C of three phases, and a salient field pole 3. A rotational position detector 4 is connected to a field pole 3 and rotates together therewith. The output of rotational position detector 4 takes the form of a signal which represents the rotational position of field pole 3, and is fed to a speed signal generator 5 and to a unit 14 which produces a signal that represents the rotational position of the field pole.

The output of speed signal generator 5 takes the form of a signal which represents the rotational speed of synchronous motor 1, i.e., which represents the angular velocity $\omega r$ of field pole 3, and is fed to a subtractor 6 which produces the difference ($\omega o - \omega r$) between the desired speed signal $\omega o$ and a speed signal $\omega r$ from speed signal generator 5 as an error signal. Based upon the error signal ($\omega o - \omega r$), a frequency signal generator 7 synthesizes frequency signals having each f and (f+$\Delta$f), where f indicates the frequency of the three-phase current control power supply which drives synchronous motor 1 at the moment when the speed signal $\omega r$ is generated for synchronous motor 1, and $\Delta$f indicates the difference in frequency that should be added to the frequency f of three-phase current control power supply 12 from the moment when the speed signal $\omega r$ is generated until the rotational speed of synchronous motor 1 reaches the speed set by desired speed signal $\omega o$.

The control device includes a memory 8 for storing values of characteristics concerning synchronous motor 1, i.e, for storing the values of armature resistance r, direct-axis inductance Ld of the armature, quadrature-axis inductance Lq of the armature, and the like. Relying upon the frequency signals f, and (f+$\Delta$f) produced by frequency signal generator 7 and based upon the data of memory 8, a first calculation unit 9 calculates the torque angle $\delta_{m1}$ at the moment when the speed signal $\omega r$ is detected and the torque angle $\delta_{m0}$ at the moment when the speed has reached the desired speed in accordance with the equation (13), and discriminates whether $\delta_{m1}$ and $\delta_{m0}$ are in agreement or not. When they are not in agreement, first calculation unit 9 produces the torque angle $\delta_{m1}$ upon each detection of the speed signal. When they are in agreement, first calculation unit 9 produces the torque angle $\delta_{m0}$ upon each detection of the speed signal. Here, when first calculation unit 9 produces the torque angle $\delta_{m1}$, it means that synchronous motor 1 must be accelerated or decelerated and when first calculation unit 9 produces the torque angle $\delta_{m0}$, it means that the synchronous motor 1 should be rotated at a constant speed.

The output of first calculation unit 9 and the data stored in memory 8 are fed to a second calculation unit 10 which calculates a quadrature-axis current component Iq in the armature current I relying upon these values and the terminal voltage V in accordance with the equation (20), which also calculates a direct-axis current component Id in accordance with the equation (19), and which maintains the armature current I at a rated value. The output from second calculation unit 10 enters into a three-phase conversion unit 11, and is converted into desired current signals for armature windings 2A, 2B and 2C of three phases. The desired current signals are compared with armature current signals ia', ib' and ic' which are detected by an armature current detector 15, whereby the differences serve as current control signals.

The output of first calculation unit 9, the output of second calculation unit 10 and the output of unit 14 which produces a signal that represents the position of the field pole, are all fed to a third calculation unit 13 which calculates the difference between the torque angle $\delta_m$ and the power-factor angle $\phi$ based upon these values and the data stored in memory 8 in accordance with the equation (18), i.e., calculates the phase difference ($\delta_m - \phi$) between the induced electromotive force E and the armature current I. The output of third calculation unit 13 and the output of three-phase conversion unit 11 are fed to three-phase current control power supply 12, thereby to control the magnitude and phase of the armature currents ia, ib and ic that flow through armature windings 2A, 2B and 2C of synchronous motor 1.

Even when the synchronous motor 1 is to be rotated at speeds faster than the rated speed, therefore, it is possible to maintain constant the terminal voltage V and the armature current I, in order to maintain the power output of synchronous motor 1 constant.

Figure 3:
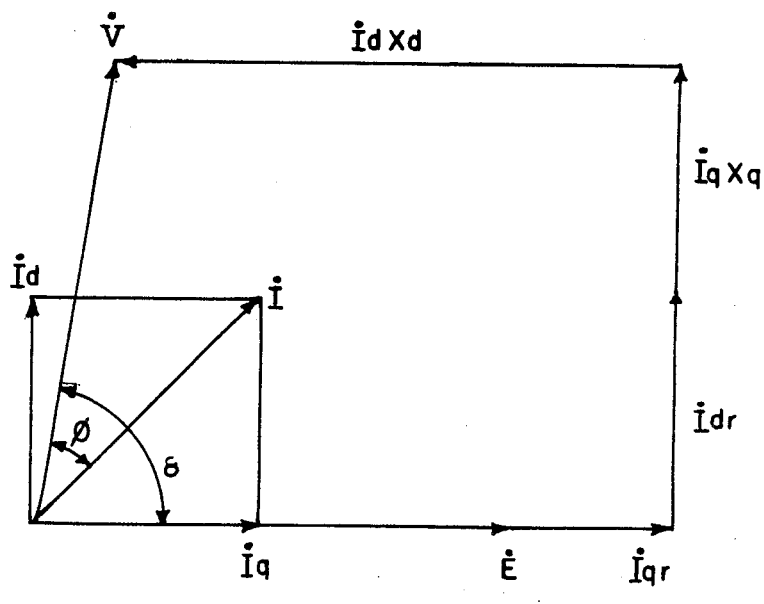
FIG. 3 illustrates a vector diagram showing a relationship between the voltage and the current when the salient pole-type synchronous motor is operated by the control system of the present invention.

FIG. 3 illustrates a vector diagram of voltage and current when the synchronous motor having a rated rotational speed of 1000 rpm is so controlled as to rotate at doubled speed of the rated speed, i.e., to rotate at 2000 rpm.

Figure 4:
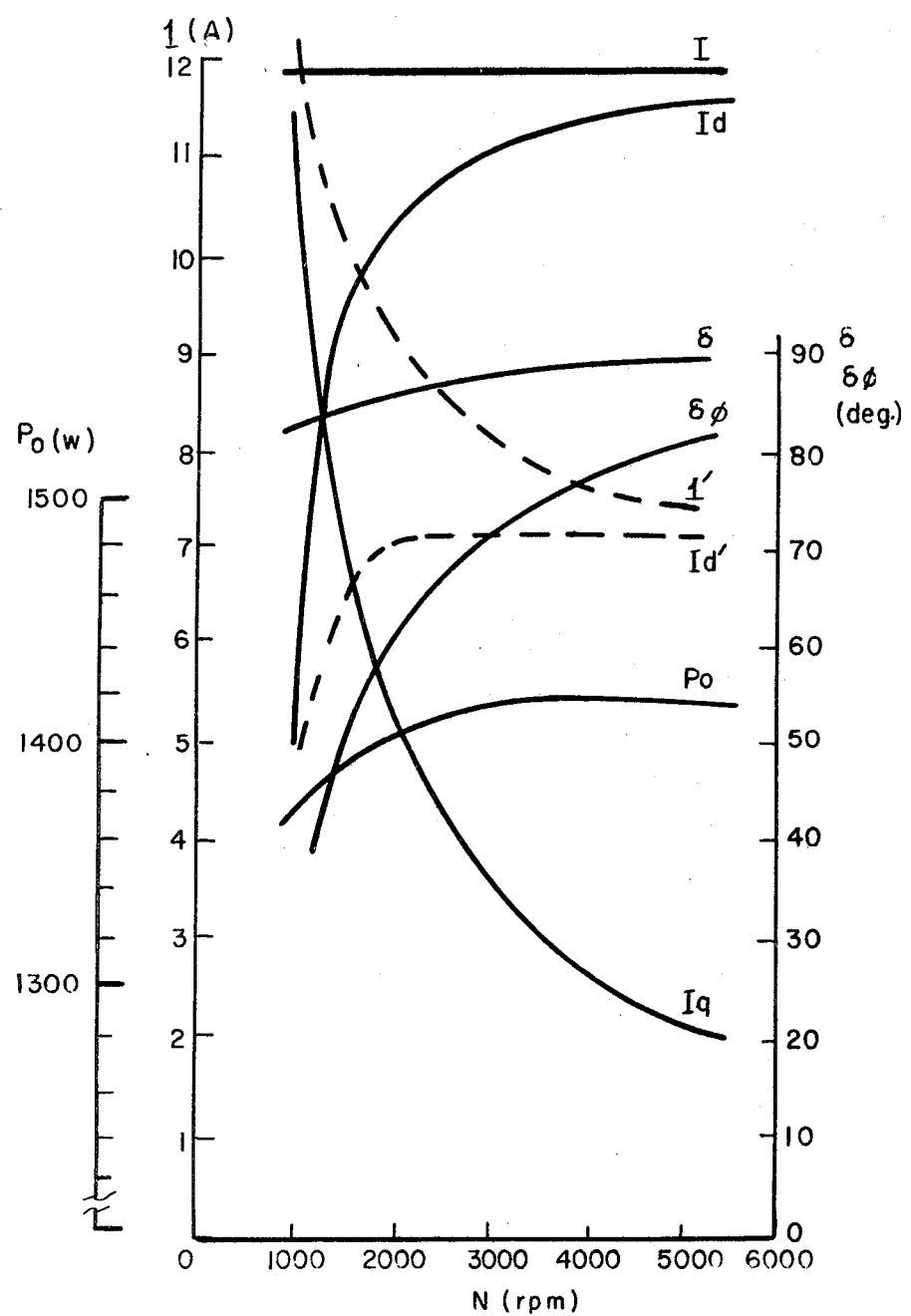
FIG. 4 shows a graphical representation of characteristics of the motor controlled by the control system of the present invention.

FIG. 4 shows transitions of the armature current I [amps], direct-axis current component Id [amps], quadrature-axis current component Iq [amps], output Po [watts], torque angle $\delta_m$ [degrees], and difference ($\delta_m - \phi$) between the torque angle $\delta_m$ and the power-factor angle $\phi$ when the synchronous motor having a rated rotational speed of 1000 rpm as shown in FIG. 3 is controlled in accordance with the above-mentioned control system. In FIG. 4, the output Po [watts] of the synchronous motor changes over a range of from about 1430 [watts] to 1460 [watts] while the rotational speed changes from 1000 rpm to 5000 rpm. The range, however, is only several percent of the average output between the speeds of 1000 rpm and 5000 rpm. Namely, when the synchronous motor is controlled in accordance with the control system of the present invention, the output can be maintained substantially constant even when the motor rotates at speeds faster than the rated rotational speed, and the terminal voltage is also maintained substantially constant. FIG. 4 further teaches that the armature current I remains substantially constant, and the output Po becomes approximately constant at speeds higher than the rated rotational speed.

For the purpose of reference, furthermore, broken lines I′ and Id′ in FIG. 4 represent the armature current and the direct-axis component of the armature current when the synchronous motor is controlled relying upon three control quantities, i.e., relying upon the torque angle $\delta_m$, magnitude and phase of the armature current I or the torque angle $\delta_m$, and the quadrature-axis current component Iq and the direct-axis current component Id.

Further, the present invention can be adapted to either the single-phase system or the multi-phase system, as mentioned earlier.

According to the present invention as described above, the synchronous motor can be rotated at speeds faster than the rated speed without the need of increasing the power-supply voltage despite the increase in the frequency, and a substantially constant output can be obtained.

While a preferred embodiment has been described, variation thereto will occur to those skilled in the art within the scope of the present inventive concepts which are delineated by the following claims.

What is claimed is:

1. A control system for driving a synchronous motor at speeds greater than rated speed, to which a desired speed signal and a signal representing the rotational position of the rotor of said motor are applied comprising:

speed signal generating means for generating a rotational speed signal representing the rotational speed of said rotor;

rotational position signal generating means for generating a signal representing the rotational position of the field pole of said motor;

means for producing a difference signal between said desired speed signal and said rotational speed signal;

calculating means for calculating first armature current component value (Id) and second armature current component value (Iq) for said synchronous motor, and for calculating a power factor ($\phi$) and producing signals in accordance with said calculations; and power supplying means for supplying armature current to said armature windings of said motor in accordance with the signals of said calculating means so that the magnitude of the armature current and voltage remain substantially constant.

2. Control system for driving a synchronous motor as in claim 1, wherein said control system is so effected as to satisfy a torque angle $\delta_m$, $$\tan\delta_m = \frac{Kd\omega r}{r}$$

wherein $\omega r$ denotes the angular velocity of a rotor of the synchronous motor, I denotes armature current, r denotes armature resistance, Xd and Xq denote a direct-axis reactance and a quadrature-axis reactance, V denotes a terminal voltage, E denotes an induced electromotive force, $\phi$ denotes a power-factor angle, and Kd denotes a coefficient, and the control system is further so effected that a phase difference $(\delta_m - \phi)$ between the induced electromotive force E and the armature current I satisfies, $$\tan(\delta_m - \phi) = \frac{V(r \cdot \sin\delta_m - Xq \cdot \cos\delta_m) + Xq \cdot E}{V(r \cdot \cos\delta_m + Xd \cdot \sin\delta_m) - r \cdot E}$$

while maintaining the armature current I constant.

3. Control system for driving a synchronous motor as in claim 1, wherein said calculating means comprises a frequency signal generator which produces first and second frequency signals from said difference signal;

a memory for storing values of characteristics concerning said synchronous motor;

first calculating means for calculating a torque angle value from said stored values and said frequency signals and producing a torque value signal;

second calculating means for calculating said first and second armature current values from said torque angle value signal and said stored values; and third calculating means for calculating the phase difference between induced electromotive force and armature current.

* * * * *